US012090639B2

(12) United States Patent
Haruna

(10) Patent No.: US 12,090,639 B2
(45) Date of Patent: Sep. 17, 2024

(54) ATTACHING/DETACHING STRUCTURE

(71) Applicant: KOSMEK LTD., Kobe (JP)

(72) Inventor: Yosuke Haruna, Akashi (JP)

(73) Assignee: KOSMEK LTD. (JP)

( * ) Notice: Subject to any disclaimer, the term of this patent is extended or adjusted under 35 U.S.C. 154(b) by 352 days.

(21) Appl. No.: 17/824,079

(22) Filed: May 25, 2022

(65) Prior Publication Data

US 2022/0388182 A1 Dec. 8, 2022

(30) Foreign Application Priority Data

Jun. 3, 2021 (JP) .................................. 2021-093912

(51) Int. Cl.
*B25B 11/00* (2006.01)
*B25J 15/04* (2006.01)
*B29C 45/42* (2006.01)

(52) U.S. Cl.
CPC ....... *B25J 15/0433* (2013.01); *B25J 15/0425* (2013.01); *B29C 45/4225* (2013.01)

(58) Field of Classification Search
CPC ......... B25B 11/00; B25B 1/2452; B25B 5/14; B29C 45/4225; B25F 15/00425
See application file for complete search history.

(56) References Cited

U.S. PATENT DOCUMENTS

| 2014/0340809 | A1* | 11/2014 | Tseng | ................... | B25J 15/0226 361/213 |
| 2020/0108497 | A1* | 4/2020 | Miyazaki | ............. | B25J 19/0033 |
| 2022/0288794 | A1* | 9/2022 | Shinozuka | ........... | B25J 15/0475 |
| 2022/0388182 | A1* | 12/2022 | Haruna | ................ | B25J 15/0433 |

FOREIGN PATENT DOCUMENTS

JP        2001-87971        4/2001

OTHER PUBLICATIONS

Machine generated translation of JP2001-87971, seven (7) pages.

* cited by examiner

*Primary Examiner* — Lee D Wilson
(74) *Attorney, Agent, or Firm* — Merek, Blackmon & Voorhees, LLC

(57) ABSTRACT

Provided is an attaching/detaching structure that operates reliably with simple operation. The attaching/detaching structure attaches/detaches a second connecting member (4) to/from a first connecting member (3). An operation chamber (8) formed in a base member (5) of the second connecting member (4) is connected to the outside of the base member (5) via an insertion hole (7) opened to a seating surface (6) of the first connecting member (3). Two clamp arms (10) and (11) are provided in the operation chamber (8) so as to be symmetrical around an axial center of the operation chamber (8). An engaging portion (16, 17) is formed at one end (10b, 11b) in longitudinal direction of each of the clamp arms (10, 11). An engaging member (32) protruding from the second connecting member (4) can be inserted into the insertion hole (7). A lock portion (34) in which the engaging portions (16, 17) can be engaged is formed in the engaging member (32).

7 Claims, 10 Drawing Sheets

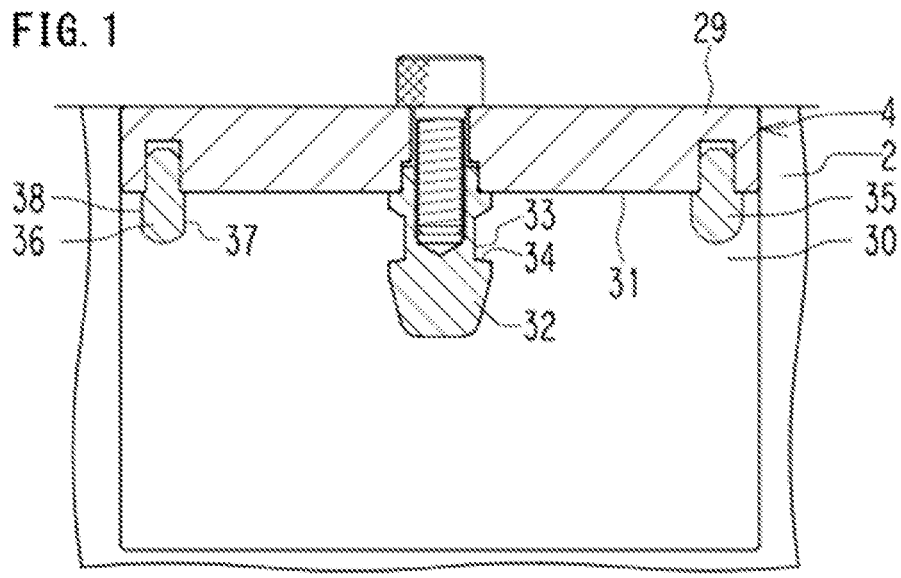
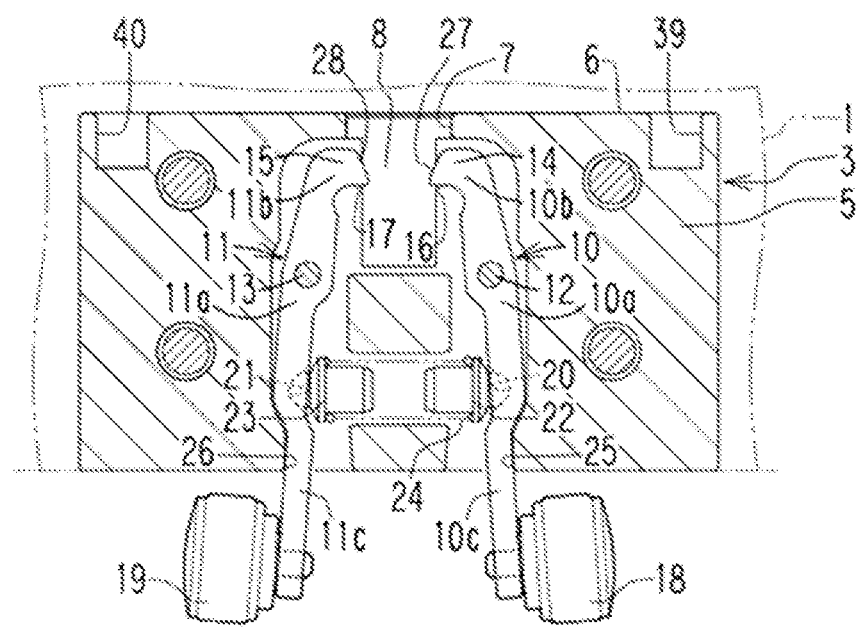
FIG. 1

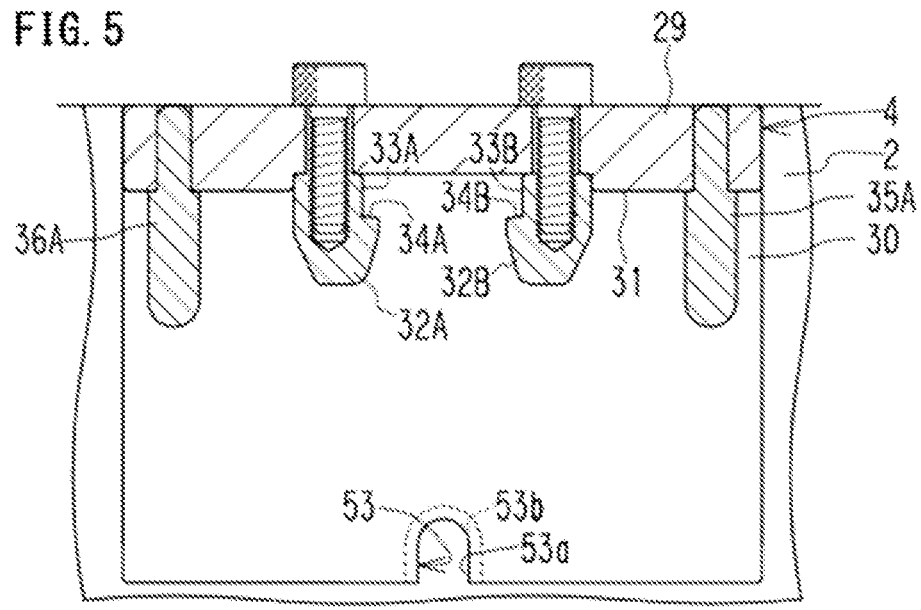
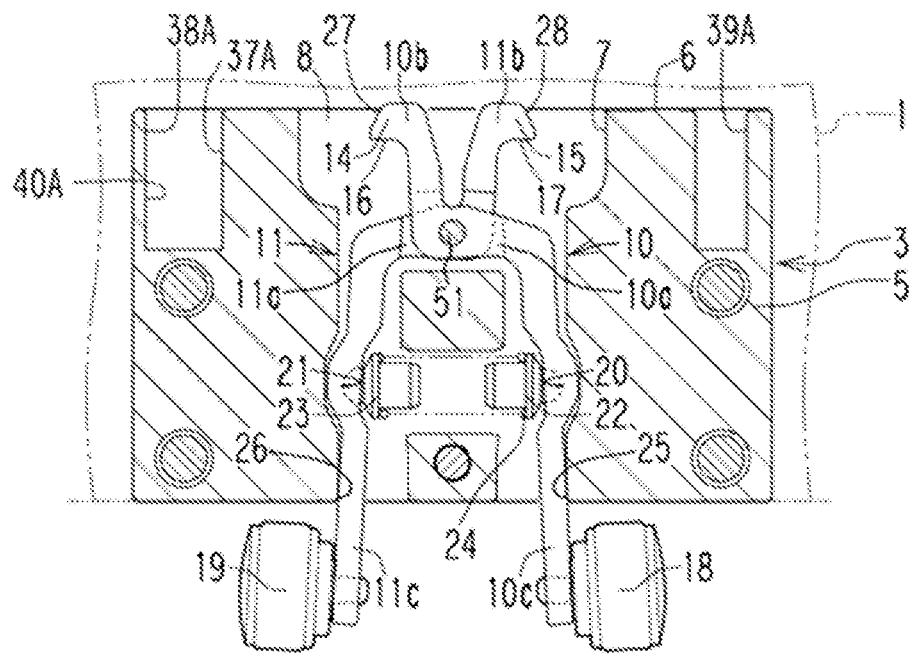
FIG. 5

FIG. 9A
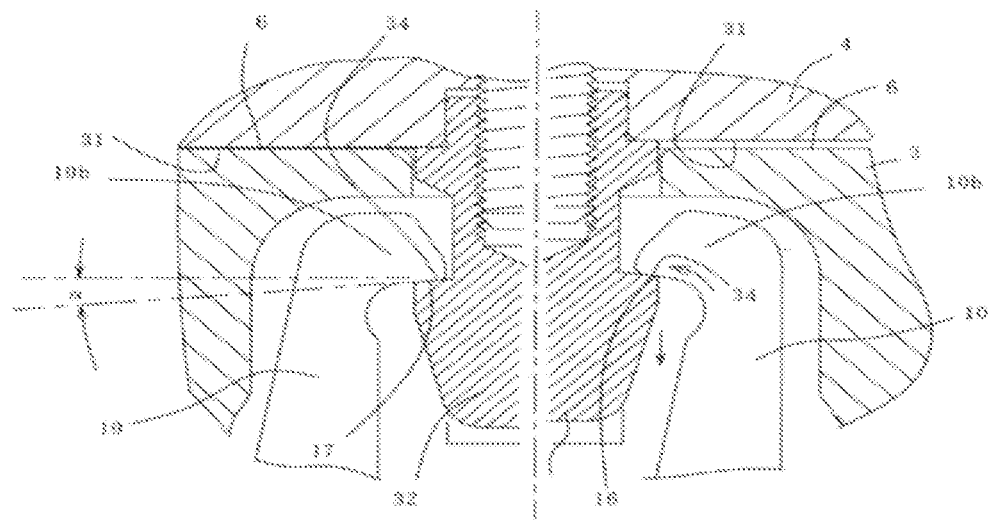
FIG. 9B
FIG. 9C
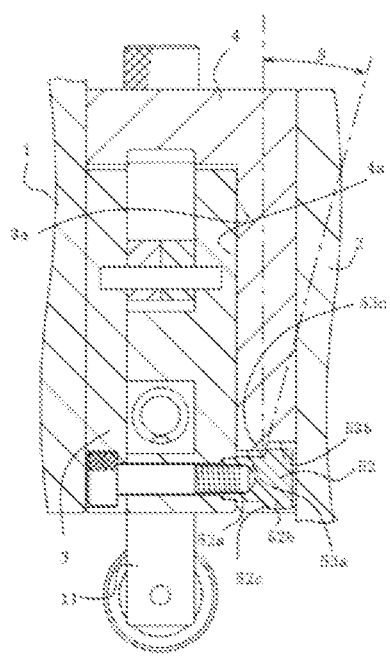

US 12,090,639 B2

ATTACHING/DETACHING STRUCTURE

BACKGROUND OF THE INVENTION

Field of the Invention

The present invention relates to a structure for attaching/detaching workpieces, molds, pallets, robot hands, tools, and so on, to/from bases, robots, sliders, and so on.

Description of the Related Art

Conventionally, this type of attaching/detaching structure has been described in Patent Document 1 (Japanese Unexamined Patent Application Publication No. 2001-87971). The prior art is composed as follows.

The above-described attaching/detaching structure is a structure that attaches/detaches a holder holding a jig tool to/from an attachment fixed to a taking out arm of a molded product taking out device. A locking claw portion protrudes downward from a lower wall of a holder. An insertion hole in which the locking claw portion can be inserted is formed in an attachment body. A slide claw that slides in and out of the insertion hole is inserted into the attachment body. A knob is protruded to the right from the slide claw to the outside of the attachment body via a lever. A spring is attached between the slide claw and the right wall of the attachment body outside the outer peripheral wall of the lever, and the spring urges the attachment body to insert the slide claw into the insertion hole. When attaching the holder to the attachment, an operator operates by pulling the knob to insert the locking claw portion of the holder into the insertion hole. Next, when the operator releases the knob, the spring engages the slide claw with the locking claw portion. According to this, the holder is attached to the attachment.

The above-mentioned prior art has following problems.

In the prior art, when attaching/detaching the holder to/from the attachment of the taking out arm, the operator needs to hold the taking out arm down with one hand so as not to move it, and at the same time hold the jig tool so as not to fall, and to pull the knob of the attaching/detaching structure with the other hand. Therefore, it is necessary to attach/detach while paying close attention and performing a plurality of operations at the same time so that the force to pull the knob acts on the taking out arm does not shift the position of the taking out arm.

An object of the present invention is to provide an attaching/detaching structure that operates reliably with simple operation.

BRIEF SUMMARY OF THE INVENTION

In order to achieve the above object, a first invention is structured as follows, for example, as shown in FIG. 1 to FIG. 4 and FIG. 5 to FIG. 8.

The above-described attaching/detaching structure is for attaching/detaching a second connecting member 4 to/from a first connecting member 3, and is structured as follows. A seating surface 6 on which the second connecting member 4 can be contacted is formed on a base member 5 of the first connecting member 3. An operation chamber 8 formed in the base member 5 is transmitted to the outside of the base member 5 via an insertion hole 7 opened to the seating surface 6. Two clamp arms 10 and 11 are provided in the operation chamber 8 so that they are symmetrical around an axial center of the operation chamber 8. Further, longitudinal midway or intermediate portions 10a and 11a of the clamp arms 10 and 11 are rotatably supported by rotary support shafts 12 and 13 protruding from the inner wall of the operation chamber 8 or rotary support shaft 51. Engaging portions 16 and 17 are formed at one ends 10b and 11b in the longitudinal direction of the clamp arms 10 and 11. Operation portions 18 and 19 are provided at the other ends 10c and 11 c in the longitudinal direction of the clamp arms 10 and 11. So as to separate the operation portions 18 and 19, an urging means 24 rotates the clamp arms 10 and 11. An engaging member 32 protruded from the second connecting member 4 or two engaging members 32A and 32B can be inserted into the insertion hole 7. Lock portions 34, 34A, and 34B with which the engaging portions 16 and 17 can be engaged are formed in the engaging members 32, 32A, and 32B. Positioning pins 35, 36, 35A, and 36A that can be inserted into reference holes 39, 40, 39A, and 40A formed on one of the first connecting member 3 and the second connecting member 4 are protruded from the other member of the first connecting member 3 and the second connecting member 4 to be in parallel with the engaging members 32, 32A and 32B, The above-mentioned first invention has the following action effect.

Since the engaging member of the second connecting member is inserted into the insertion hole when attaching the second connecting member to the first connecting member, the engaging member rotates the clamp arm against the urging force of the urging means, and then, to engage the engaging portion of the clamp arm with engaging portion of the engaging member. Thereby, the second connecting member can be easily connected to the first connecting member.

Further, when the second connecting member is detached from the first connecting member, the operator grips and operates so that the two clamp arms are close together, so that the engaging portion of the clamp arm and the engaging portion of the engaging member are separated. At the time of operation, the operator applies pressing forces in an opposite direction on the clamp arm. Therefore, the respective pressing forces are cancelled out to have almost no effect on the first connecting member or the second connecting member. Therefore, the pressing force from the gripping operation pushes other members such as sliders through the first connecting member, preventing them from shifting their stopping positions.

In order to achieve the above object, in a second invention, an attaching/detaching structure is structured as follows, for example, as shown in FIGS. 5 to 8.

The above-described attaching/detaching structure attaches a second connecting member 4 detachably to a first connecting member 3, and is structured as follows. A seating surface 6 on which the second connecting member 4 can be contacted is formed on a base member 5 of the first connecting member 3. An operation chamber 8 formed in the base member 5 is transmitted to the outside of the base member 5 via an insertion hole 7 opened to the seating surface 6. Two clamp arms 10 and 11 are provided in the operation chamber 8 so that they are symmetrical around an axial center of the operation chamber 8. Further, longitudinal midway or intermediate portions 10a and 11a of the clamp arms 10 and 11 are rotatably supported by rotary support shaft 51 protruding from an inner wall of the operation chamber 8. Engaging portions 16 and 17 are formed at one ends 10b and 11b in the longitudinal directions of the clamp arms 10 and 11. Operation portions 18 and 19 are provided at the other ends 10c and 11c in the longitudinal directions of the clamp arms 10 and 11. So as to separate the operation portions 18 and 19, an urging means 24 rotates the clamp arms 10 and 11. Engaging members 32A and 32B protruding from a ceiling surface 31 of the second connecting member 4 can be inserted into the insertion hole 7. Lock portions 34A and 34B with which the engaging portions 16 and 17 can be engaged are formed in the engaging members 32A and 32B. A supporting surface 41 intersecting the seating surface 6 is formed on the base member 5. A supported surface 42 intersecting the ceiling surface 31 is formed in the second connecting member 4. Further, the supported surface 42 can be contacted with the supporting surface 41. In a guide groove 53 opened to one side of the supporting surface 41 and the supported surface 42, a supporting member 52 protruding from the other side of the supporting surface 41 and the supported surface 42 is inserted.

The first invention and the second invention are preferably added the following (1) and (2) structures.

(1) For example, as shown in FIG. 1 to FIG. 4, protrusions 14 and 15 are protruded on the one ends 10b and 11b of the clamp arms 10 and 11 toward the axial center of the operation chamber 8 so as to face each other. The engaging portions 16 and 17 are structured by a part of the protrusions 14 and 15. A recess 33 is formed on the outer wall of the engaging member 32. The lock portion 34 is structured by a part of the recess 33.

(2) For example, as shown in FIG. 5 to FIG. 8, a protrusion 14 protruding to the one end portion 10b of the clamp arm 10 and a protrusion 15 protruding to the one end portion 11b of the clamp arm 11 are formed toward the inner wall of the operation chamber 8, respectively, so as not to face each other. The engaging portions 16 and 17 are structured by a part of the protrusions 14 and 15. Two engaging members 32A and 32B are provided to the first connecting member 3. A recess 33A formed in one engaging member 32A faces to a recess 33B formed in the other engaging member 32B. The lock portions 34A and 34B are structured by a part of the recesses 33A and 33B.

In the second invention, it is preferable to add the following structure.

The supporting member 52 includes a small diameter portion 52a and a large diameter portion 52b formed in order from the base end side to the tip side. The small diameter portion 52a of the supporting member 52 is inserted into the guide groove 53.

In this case, when an external force acts on the second connecting member in a direction in which the supported surface of the second connecting member is separated from the supporting surface of the first connecting member with the second connecting member connected to the first connecting member, the large diameter portion of the first connecting member receives the peripheral wall of the guide groove of the second connecting member. According to this, the external force can be prevented from acting on the connection portion between the first connecting member and the second connecting member, thereby preventing wear and tear of the connection portion.

BRIEF DESCRIPTION OF THE INVENTION

FIG. 1 shows the first embodiment of the present invention and is a schematic diagram of an attaching/detaching structure in a detached state, viewed in cross section.

FIG. 5 shows a second embodiment of the present invention and is a diagram similar to FIG. 1.

FIGS. 9A, 9B and 9C are diagrams that further explain the details of the attaching/detaching structure of the present invention.

DETAILED DESCRIPTION OF THE PREFERRED EMBODIMENT

Figure 2:
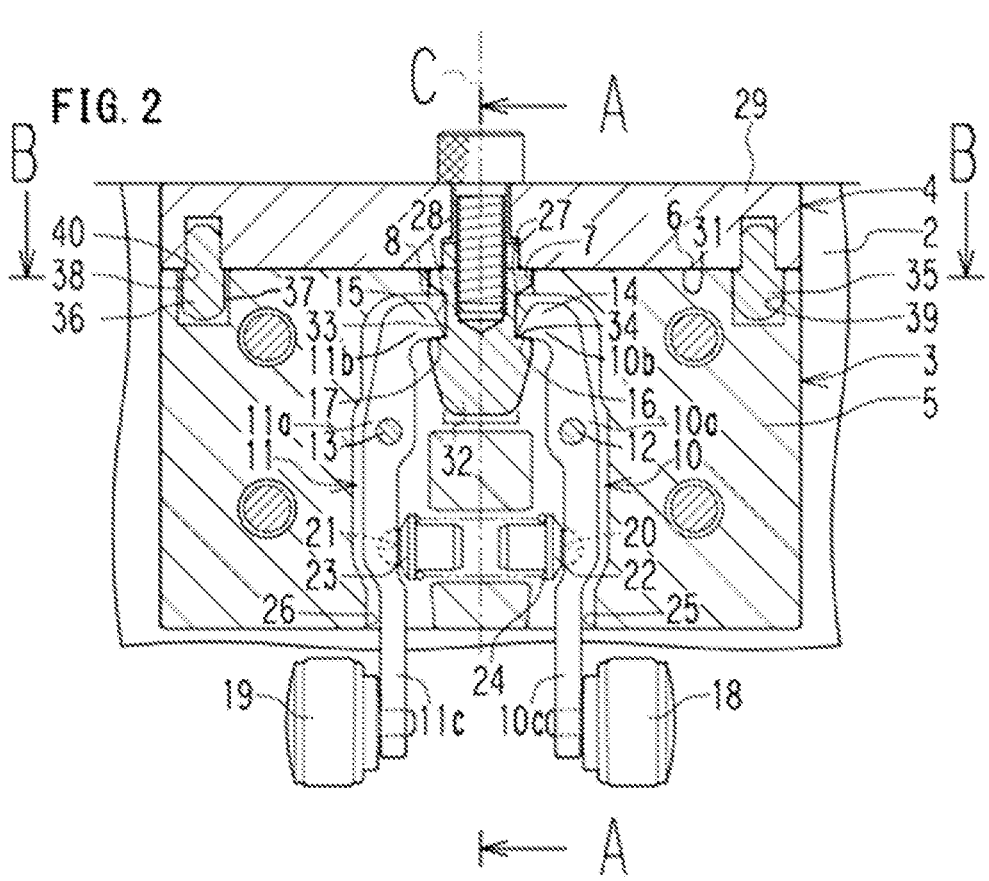
FIG. 2 is an operation explanatory diagram of the attaching/detaching structure, and shows an attached state of the attaching/detaching structure.

Hereinafter, embodiments of the present invention will be described with reference to FIG. 1 and FIG. 2.

This embodiment illustrates a case in which an attaching/detaching structure that attaches/detaches a tool 2 to/from a movable portion 1 of a slider of a taking out device is applied to a taking out device that takes out molded products from an injection molding machine.

The above-described taking out device is provided with a slider composed of a motor, a ball screw shaft, and so on. The tool 2 is attached to the movable portion 1 of the slider via a first connecting member 3 and a second connecting member 4 of the attaching/detaching structure. A base member 5 of the first connecting member 3 is fixed to the movable portion 1. A seating surface 6 that accepts the second connecting member 4 is provided on the upper wall of the base member 5 of the first connecting member 3. An insertion hole 7 is opened to the seating surface 6, and an operation chamber 8 that passes through the insertion hole 7 is formed to the inside of the base member 5 concentric with the insertion hole 7.

In the above operation chamber 8, a clamp arm 10 (on the right side in the figure) and a clamp arm 11 (on the left side in the figure) are provided in the above-mentioned operation chamber 8 so as to be symmetrical around the axial center C of the operation chamber 8 (see FIG. 2) and so as to extend in a vertical direction. Longitudinal midway portions 10a and 11a of the clamp arms 10 and 11 are rotatably supported by rotary support shafts 12 and 13 protruding from an inner wall of the operation chamber 8, respectively. Protrusions 14 and 15 are protruded inward from longitudinal tips (one end portions) 10b and 11 b of the clamp arms 10 and 11 toward the axial center C of the operation chamber 8, respectively. Engaging portions 16 and 17 are provided on the lower surfaces (base end surface) of the protrusions 14 and 15. Longitudinal base end portions (other end portions) 10c and 11 c of the clamp arms 10 and 11 are protruded downward from the operation chamber 8 toward the outside, respectively. The base end portions 10c and 11c are provided with operating members 18 and 19 that the operator grasps with a hand (or finger), respectively.

Recesses 20 and 21 are provided between the rotational support shafts 12 and 13 and the base end portions 10c and 11c in the middle portion in the longitudinal direction of the above-mentioned two clamp arms 10 and 11 so as to face each other. A convex portion of a spring receiver 22 is inserted into one recess 20, and a convex portion of another spring receiver 23 is inserted into the other recess 21. Each of the spring receivers 22 and 23 has the above-mentioned convex portion, a flange portion, and a spring guide portion. A holding spring 24 composed of a compression spring is attached between the flange portion of one spring receiver 22 and the flange portion of the other spring receiver 23. The spring guide portion of the one spring receiver 22 is externally fitted to one end of the holding spring 24, and the other spring receiver of the holding spring 23 is externally fitted to the other end of the holding spring 24. The holding spring 24 urges the two clamp arms 10 and 11 so as to separate the base end portions 10c and 11c. In addition, stoppers 25 and 26 are provided on the inner wall of the operation chamber 8, and the clamp arms 10 and 11 urged by the holding spring 24 are accepted by the stoppers 25 and 26. At this time, the protrusions 14 and 15 of the two clamp arms 10 and 11 are in the closest state. Guide surfaces 27 and 28 are formed on the inner wall of the protrusions 14 and 15 of the clamp arms 10 and 11. As shown in FIG. 2, the two guide surfaces 27 and 28 are formed so as to be inclined with respect to the axial center C of the operation chamber 8 so as to expand toward the tip end (away from the axial center C of the operation chamber 8).

Figure 3:
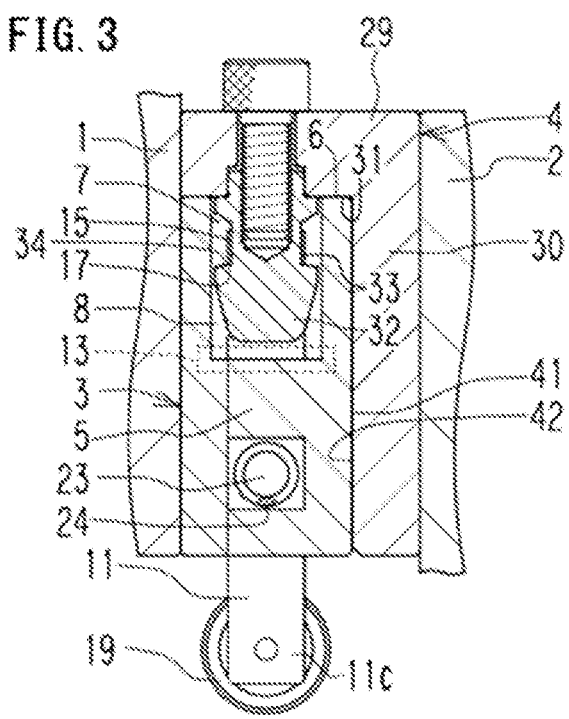
FIG. 3 is a diagram viewing from the arrow direction of the A-A line of FIG. 2.

As shown in FIG. 3, the second connecting member 4 is formed in an inverted L shape in a side view, and has a top plate 29 and a side wall 30. An engaging member 32 is protruded downward from a ceiling surface 31 of the top plate 29. The engaging member 32 can be inserted into the insertion hole 7 of the first connecting member 3. A groove (recess) 33 is formed in the circumferential direction at the middle portion in the height direction of the engaging member 32, and a lock portion 34 is formed on the peripheral wall of the groove 33. The engaging portions 16 and 17 of the clamp arms 10 and 11 of the first connecting member 3 can be engaged with the lock portion 34.

Figure 4:
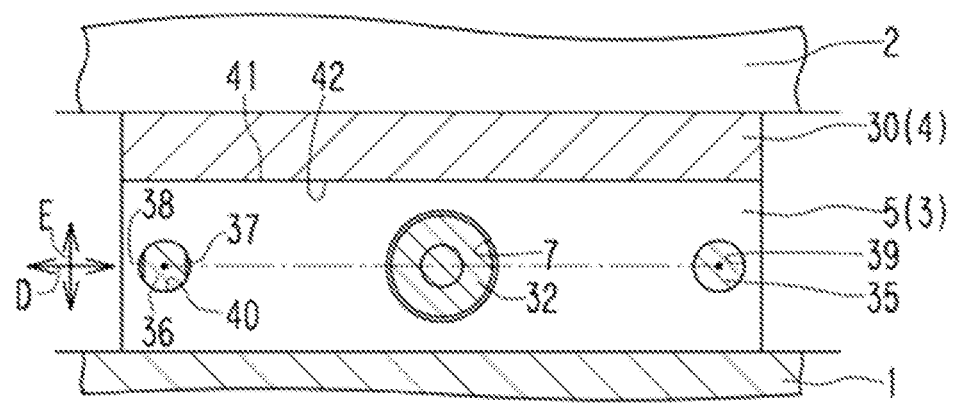
FIG. 4 is a diagram viewing from the arrow direction of the B-B line of FIG. 2.

Two positioning pins 35 and 36 are protruded downward from the top plate 29 so as to be parallel to the engaging member 32 at predetermined intervals on the left and right sides of the engaging member 32. As shown in FIG. 1 and FIG. 2, the positioning pin 35 on the right side is formed in an almost cylinder having a height lower than that of the engaging member 32, and its tip portion is formed in a spherical shape. The positioning pin 36 on the left side is also formed so as to have the same height and shape as the positioning pin 35 on the right side, but two parallel planar escape portions 37 and 38 are formed on the outer peripheral wall of the cylinder. As shown in FIG. 4, the escape portions 37 and 38 are formed so as to be orthogonal to a direction in which the axial centers of the two positioning pins 35 and 36 are connected in a plane view. The positioning pins 35 and 36 can be inserted into reference holes 39 and 40 of the base member 5. Each sliding gap from the outer peripheral surfaces of the positioning pins 35 and 36 to the inner peripheral surfaces of the reference holes 39 and 40 is about 0.01 to 0.1 mm, and preferably 0.015 to 0.05 mm. When the positioning pin 35 on the right side is inserted into the reference hole 40 on the left side, the second connecting member 4 is positioned horizontally with reference to the base member 5. Further, by inserting the positioning pin 36 on the left side into the reference hole 40 on the left side, the second connecting member 4 can move a distance slightly longer than the sliding gap in a direction connecting the axial centers of the two positioning pins 35 and 36 in a plane view (a direction D in FIG. 4) due to the escape portions 37 and 38, and are positioned in a direction orthogonal with reference to the direction connecting the axial centers of the two positioning pins 35 and 36 in a plane view (a direction E in FIG. 4) (movement is restricted).

As shown in FIG. 3 and FIG. 4, a supported surface 42 formed on the side wall of the second connecting member 4 is formed on a supporting surface 41 formed on the side wall of the first connecting member 3. Accordingly, when the external force acts so that the second connecting member 4 is pushed toward the first connecting member 3, the supported surface 42 of the second connecting member 4 is accepted to the supporting surface 41 of the first connecting member 3. Therefore, it is possible to prevent wear and breakage of the connecting portion between the first connecting member 3 and the second connecting member 4, and the connected state between the first connecting member 3 and the second connecting member 4 is surely maintained.

The above-mentioned attaching/detaching structure operates as follows as shown in FIG. 1 and FIG. 2.

In order to be in an attached state of FIG. 2 from a detached state of FIG. 1, an operator inserts the engaging member 32 of the second connecting member 4 into the insertion hole 7 of the base member 5 of the first connecting member 3 when attaching the second connecting member 4 to the base member 5 of the first connecting member 3. Then, the tip of the engaging member 32 is contacted with the guide surfaces 27 and 28 of the clamp arms 10 and 11, and then the engaging member 32 separates the tips 10b and 11b of the clamp arms 10 and 11 against the urging force of the holding spring 24. Subsequently, the groove 33 of the engaging member 32 is inserted to a position facing the protrusions 14 and 15 of the clamp arms 10 and 11, the urging force of the holding spring 24 rotates the clamp arms 10 and 11 to insert the protrusions 14 and 15 into the groove 33 of the engaging member 32. The engaging portions 16 and 17 of the clamp arms 10 and 11 are engaged to the lock portion 34 of the engaging member 32. Thereby, even if the external force acts on the second connecting member 4 in the direction of detaching the second connecting member 4 from the first connecting member 3, the lock portion 34 of the engaging member 32 and the engaging portions 16 and 17 of the clamp arms 10 and 11 are accepted to the base member 5 via the rotary support shafts 12 and 13. Therefore, it is prevented from unintentionally detaching the second connecting member 4 from the first connecting member 3.

When the second connecting member 4 is detached from the first connecting member 3, the operator grips the operating portions 18 and 19 of the two clamp arms 10 and 11 so as to be close to each other. Then, the engaging portions 16 and 17 of the clamp arms 10 and 11 are separated from the lock portion 34 of the engaging member 32. Thereby, the operator can detach the second connecting member 4 from the first connecting member 3 by pulling out the engaging member 32 of the second connecting member 4 from the insertion hole 7 of the first connecting member 3.

The above-mentioned first embodiment includes the following advantages.

When attaching the second connecting member 4 to the first connecting member 3, the engaging member 32 of the second connecting member 4 is inserted into the insertion hole 7, so that the engaging member 32 rotates the clamp arms 10 and 11 against the urging force of the holding spring 24 to engage the engaging portions 16 and 17 with the lock portion 32 of the second connecting member 4. Therefore, the second connecting member 4 can be easily connected to the first connecting member 3.

Further, when detaching the second connecting member 4 from the first connecting member 3, the operator grips and operates so that the two clamp arms 10 and 11 are close together, so that the engaging portions 16 and 17 of the clamp arms 10, 11 are separated from the lock portion 34 of the engaging member 32. At this time, the operator applies pressing forces on the clamp arms 10 and 11 in directions opposite each other. Therefore, the respective pressing forces are canceled to have almost no effect on other members such as the first connecting member 3 and the second connecting member 4. Therefore, the pressing forces due to the gripping operation push and move the slider or the like via the first embodiment member 3 to prevent the stop position from shifting.

FIG. 5 to FIG. 8 show the second embodiment of the present invention. In this second embodiment, the same member (or similar member) as the constituent member of the first embodiment will be described with the same reference number in principle. This second embodiment differs from the above-mentioned first embodiment as follows.

In the above-mentioned first embodiment, the protrusions 14 and 15 protrude inward from the tips 10b and 11b of the clamp arms 10 and 11 toward the axial center C of the operation chamber 8. Further, the engaging member 32 is formed in an almost cylindrical shape, and the lock portion 34 is formed in the circumferential direction on the outer peripheral wall. On the other hand, in the second embodiment, the protrusions 14 and 15 protrude outward from the tips 10b and 11b of the clamp arms 10 and 11 toward the inner peripheral wall of the operation chamber 8. Furthermore, the two engaging members 32A and 32B are protruded downward from the ceiling surface 31 of the top plate 29 of the second connecting member 4 so as to be parallel. The recesses 33A and 33B are formed on the side wall of the engaging member 32A on the left side (one side) and on the side wall of the engaging member 32B on the right side (on the other side) so as to face each other. The lock portions 34A and 34B are formed on the peripheral wall of the recesses 33A and 33B.

In the first embodiment, the clamp arm 10 on the right side is rotatably supported to the base member 5 by the rotary support shaft 12, and the clamp arm 11 on the left side is rotatably supported to the base member 5 by another rotary support shaft 13. On the other hand, in the second embodiment, one clamp arm 10 and the other clamp arm 11 are rotatably supported to the base member 5 by one rotary support shaft 51.

Figure 8:
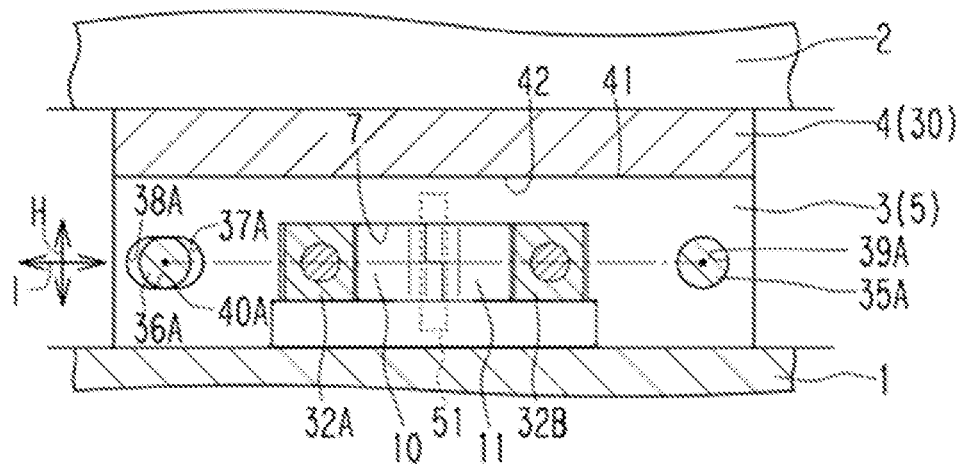
FIG. 8 is a diagram viewing from the arrow direction of the G-G line of FIG. 6.

Further, in the attaching/detaching structure of the first embodiment, as shown in FIG. 4, two reference holes 39 and 40 are composed of circular holes in a plane view. On the other hand, in the attaching/detaching structure of the second embodiment, as shown in FIG. 8, the left reference hole 40A of two reference holes 39A and 40A is composed of a long or elongated hole in a plane view. More specifically, the reference hole 40A on the left side is formed so as to extend long in a direction connecting the axial centers of the two reference holes 39A and 40A in a plane view (I direction shown in FIG. 8). Escape portions 37A and 38A are formed on the peripheral wall of the long hole-shaped reference hole 40A. The shorter diameter dimension of the reference hole 40A on the left side is the same as the diameter dimension of the reference holes 39 and 40 of the first embodiment. Further, the longer diameter dimension of the reference hole 40A of the second embodiment is structured to be longer than the diameter dimension of the reference hole 40 of the first embodiment. Further, the reference hole 39A on the right side of the second embodiment has the same diameter as the reference holes 39 and 40 of the first embodiment, and is formed in a circular shape in a plane view.

Further, the left and right positioning pins 35A and 36A are formed longer than the engaging members 32A and 32B. Further, the depth dimensions of the reference holes 39A and 40A are formed so as to be slightly longer than the positioning pins 35A and 36A. Thereby, when the second connecting member 4 is attached to the first connecting member 3, first, the left and right positioning pins 35A and 36A are smoothly inserted into the reference holes 39A and 40A with being guided along the inner peripheral surfaces thereof, and then the engaging members 32A and 32B are inserted into the insertion hole 7. Therefore, it is possible to prevent the engaging members 32A and 32B from unintentionally colliding with the members around the insertion hole 7 and being worn or damaged.

Figure 7:
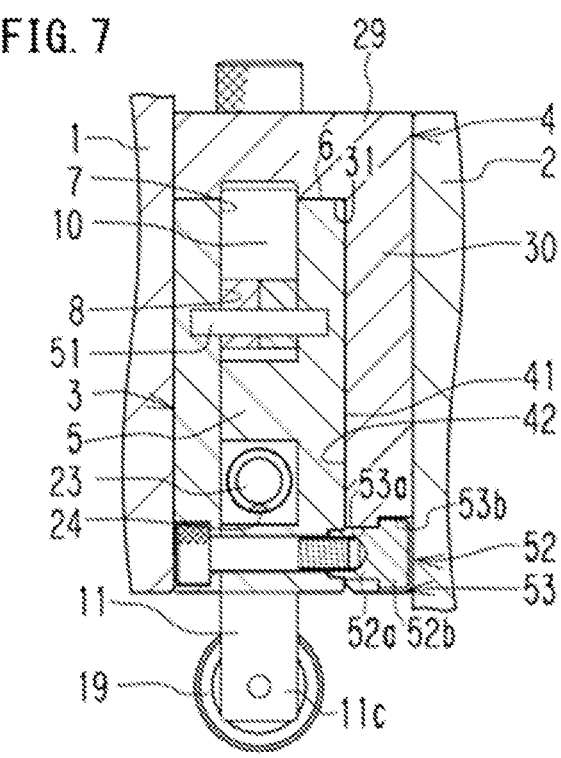
FIG. 7 is a diagram viewing from the arrow direction of the F-F line of FIG. 6.

Further, in the attaching/detaching structure of the second embodiment, as shown in FIG. 7, a supporting member 52 is protruded horizontally from the supporting surface 41 of the first connecting member 3. The supporting member 52 has a small diameter portion 52a and a large diameter portion 52b formed sequentially from the supporting surface side. A U-shaped guide groove 53 in which the small diameter portion 52a is inserted is formed on the side wall of the second connecting member 4. The guide groove 53 has a small diameter groove 53a in which the small diameter portion 52a of the supporting member 52 is inserted and a large diameter groove 53b in which the large diameter portion 52b is inserted. The groove width of the small diameter groove 53a is formed to be larger by a sliding gap than the diameter of the small diameter portion 52a and smaller than the diameter of the large diameter portion 52b. Further, the groove width of the large diameter groove 53b is formed slightly larger than the diameter of the large diameter portion 52b. Thereby, when the external force acts on the second connecting member 4 in a direction where the supported surface 42 of the second connecting member 4 separates from the supporting surface 41 of the first connecting member 3 in the state the second connecting member 4 is connected to the first connecting member 3, the large diameter portion 52b of the first connecting member 3 accepts the peripheral wall of the guide groove 53 of the second connecting member 4. Thereby, it is possible to prevent the external force from acting on the connection portion between the first connecting member 3 and the second connecting member 4 (for example, the connection portion between the engaging members 32A and 32B and the clamp arms 10 and 11, etc.). Thereby, it is possible to prevent the connection portion from being worn and damaged.

The device of the second embodiment operates as follows.

Figure 6:
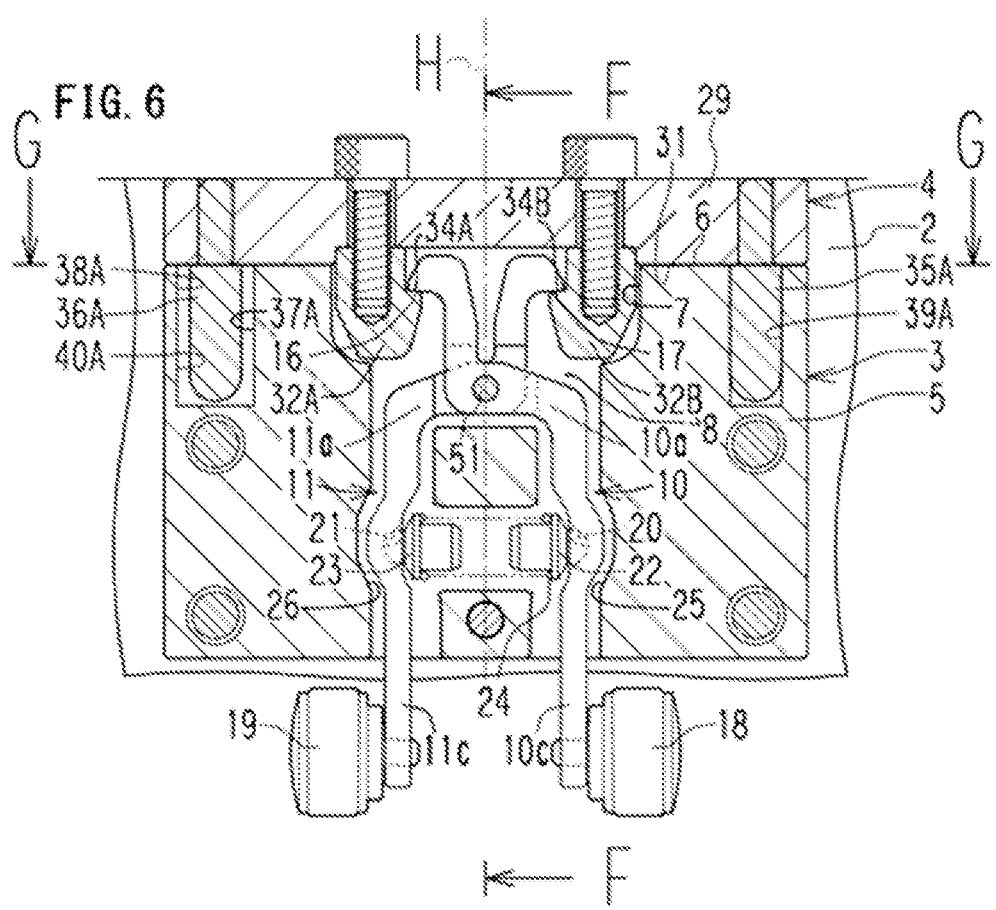
FIG. 6 is an operation explanatory diagram of the attaching/detaching structure, and shows the attached state of the attaching/detaching structure.

In order to be in the attached state of FIG. 6 from the detached state of FIG. 5, when attaching the second connecting member 4 to the first connecting member 3, the positioning pins 35A and 36A are inserted into the reference holes 39A and 40A. Next, the engaging members 32A and 32B are inserted into the insertion hole 7. Then, the tips of the engaging members 32A and 32B are contacted with the guide surfaces 27 and 28 of the clamp arms 10 and 11. Here, the guide surfaces 27 and 28 are formed so as to incline with respect to the axial direction of the insertion hole 7. Therefore, when the engaging members 32A and 32B are inserted into the insertion holes 7, the engaging members 32A and 32B bring the tips 10b and 11b of the two clamp arms 10 and 11 closer to each other against the urging force of the holding spring 24. Subsequently, when the engaging members 32A and 32B are inserted to positions of the clamp arms 10 and 11 where the recesses 33A and 33B face the protrusions 14 and 15, the urging force of the holding spring 24 inserts the protrusions 14 and 15 of the clamp arms 10 and 11 into the recesses 33a and 33b of the engaging members 32A and 32B. The engaging portions 16 and 17 of the clamp arms 10 and 11 are engaged with the lock portions 34A and 34B of the engaging members 32A and 32B. Thereby, when the external force acts on the second connecting member 4 in a direction where the second connecting member 4 is detached from the first connecting member 3, the lock portions 34A and 34B of the engaging member 32A and 32B and the engaging portions 15 and 16 of the clamp arms 10 and 11 are accepted to the base member 5 via the rotary support shaft 51. Therefore, it is prevented from unintentionally detaching the second connecting member 4 from the first connecting member 3.

Further, when the second connecting member 4 is detached from the base member 5 of the first connecting member 3, the operator grips the operation units 18 and 19 of the two clamp arms 10 and 11 so as to be close to each other. Then, the engaging portions 16 and 17 of the clamp arms 10 and 11 are separated from the lock portions 34A and 34B of the engaging members 32A and 32B. Thereby, the operator can extract the engaging members 32A and 32B from the insertion hole 7 of the first connecting member 3. Therefore, the second connecting member 4 is detached from the first connecting member 3.

In the attaching/detaching structure of the second embodiment, the positioning pins 35A and 36A and the reference holes 39A and 40A can be omitted. In this case, by setting the dimension of the groove width of the guide groove 53 larger than the diameter dimension of the small diameter portion 52a of the cylindrical supporting member 52 by about 0.01 to 0.1 mm or preferably 0.015 to 0.05 mm as a sliding gap, the same effect as the effect of positioning due to the positioning pin and the reference hole 39A can be obtained. In the attaching/detaching structure of the above-mentioned embodiments, the guide groove 53 is formed in a U shape in a side view, but the present invention is not limited to this, and other shapes such as a V shape, an arc, and an elliptical arc may be used.

The second embodiment above includes the following advantages.

When the second connecting member 4 is attached to the first connecting member 3, the engaging members 32A and 32B of the second connecting member 4 are inserted into the insertion hole 7, whereby the engaging members 32A and 32B rotate the clamp arms 10 and 11 against the urging force of the holding spring 24 and then the engaging portions 16 and 17 of the clamp arms 10 and 11 are engaged with the lock portions 34A and 34B of the engaging members 32A and 32B. Therefore, the second connecting member 4 can be easily connected to the first connecting member 3.

When the second connecting member 4 is detached from the first connecting member 3, the operator grips and operates the two clamp arms 10 and 11 so as to bring them close to each other, whereby the engaging portions 16 and 17 of the clamp arms 10 and 11 are separated from the lock portions 34A and 34B of the engaging members 32A and 32B. At the time of the operation, the operator applies pressing forces to the clamp arms 10 and 11 in directions opposite each other, and the respective pressing forces are cancelled. Therefore, the pressing forces hardly act on other members such as the first connecting member 3, the second connecting member 4 and so on. Accordingly, since the pressing forces due to the gripping operation do not push the slider or the like through the first connecting member 3, it is not necessary to hold down the slider. Therefore, the second connecting member 4 can be easily detached from the first connecting member 3.

Each of the above embodiments can be changed as follows.

The positioning pins 35, 36, 35A and 36A may be protruded upward from the seating surface 6 of the first connecting member 3 instead of being protruded downward from the ceiling surface 31 of the top plate 29 of the second connecting member 4. In this case, the reference holes 39, 40, 39A and 40A are formed at the positions facing to the positioning pins 35, 36, 35A and 36A on the top plate 29 of the first connecting member 4. Further, a well-known positioning method may be adopted instead of the positioning method by the positioning pins and the reference holes. For example, a cylindrical intermediate member is inserted into the outer peripheral surface of a cylindrical engaging member along the outer peripheral surface, and is urged to the tip side by an elastic body such as spring, rubber, or resin. The intermediate member has a tapered outer peripheral surface that tapers toward the tip. A hole is formed on the top plate of the second connecting member corresponding to the taper outer peripheral surface, and a tapered inner peripheral surface that narrows toward the back of the hole is formed on the inner peripheral wall of the hole. By engaging the tapered outer peripheral surface (of the intermediate member) with the tapered inner peripheral surface (of the hole), the second connecting member is positioned horizontally with respect to the first connecting member (movement is restricted). In this case, one positioning pin is also provided to one hole of the top plate of the second connecting member, and the second connecting member is positioned in the direction of rotation with respect to the first connecting member (movement is limited).

A holding spring as the urging means 24 may be provided between the clamp arm and the other member, for example, between the clamp arm and the peripheral wall of the operation chamber, instead of being provided to the middle portions of two clamp arms through spring receivers 22 and 23.

The attaching/detaching structure of the first embodiment may be structured so that the supporting member 52 of the second embodiment is provided in the first connecting member 3 and the guide groove 53 is provided in the second connecting member 4. Further, each attaching/detaching structure of the first and second embodiments may be structured so that the supporting member 52 is provided in the second connecting member 4 and the guide groove 53 is provided in the first connecting member 3.

In addition, various changes can be made to the extent that a person skilled in the art can assume.

Next, the details of the attaching/detaching structure of the present invention will be further described with reference to FIGS. 9A, 9B and 9C. In FIG. 9A, the lock portion 34 of the engaging member 32 of the attaching/detaching structure in the first embodiment is formed in a tapered shape that is inclined by an angle α descending with respect to the horizontal direction as it moves outward in the radial direction. Therefore, when the engaging portions 16 and 17 are engaged with the lock portion 34, the urging force of the holding spring (urging means) 24 acts downward on the engaging member 32 through the clamp arms 10 and 11. Therefore, the ceiling surface 31 of the second connecting member 4 is closely adhered to the seating surface 6 of the first connecting member 3.

The engaging portions 16 and 17 formed in the protrusions 14 and 15 of the clamp arms 10 and 11 are also tapered so as to incline with respect to the horizontal direction so as to correspond to the tapered shape of the lock portion 34. Further, since the clamp arms 10 and 11 are separate members, they operate independently of each other. Therefore, when the second connecting member 4 is attached in an inclined state with respect to the first connecting member 3, only one of the two clamp arms 10 and 11 may enter to the position of the tapered inclination of the engaging portion 16 or the engaging portion 17 of the engaging member 32, and the other may not enter the tapered inclination. At this time, since the engaging portions 16 and 17 also correspond to the tapered shape of the lock portion 34, the engaging member 32 is pushed downward via the clamp arm on the side that has entered the position of the tapered inclination by the urging force of the holding spring 24. Thereafter, the other clamp arm 11 is engaged to the engaging member 32. Thereby, the inclined state is eliminated.

The attaching/detaching structure in the second embodiment has a gap formed between the guide groove 53 and the supporting member 52. Then, since the ceiling surface 31 of the second connecting member 4 is in close contact with respect to the seating surface 6 of the first connecting member 3, the second connecting member 4 rotates with the supporting member 52 as a fulcrum with respect to the first connecting member 3, and does not get rattled.

On the other hand, in FIG. 9B, the attaching/detaching structure in the second embodiment has the guide groove 53 and the supporting member 52 modified so that the surface 53*c* between the small diameter 53*a* and the large diameter 53*b* of the guide groove 53 becomes a tapered inclination having an angle β away from the first connecting member 3 moving upward in the vertical direction and the surface 52*c* between the small diameter portion 52*a* and the large diameter portion 52*b* of the supporting member 52 becomes a tapered inclination having an angle β corresponding to the surface 53*c*. In this case, the guide groove 53 and the supporting member 52 are in a state where there is no gap between the surface 53*c* and the surface 52*c*, and it is difficult to make the ceiling surface 31 of the second connecting member 4 to the seating surface 6 of the first connecting member 3 in close contact. When this happens, the second connecting member 4 rotates and rattles with the support member 52 as a fulcrum with respect to the first connecting member 3.

The guide groove 53 and the supporting member 52 having the surface 53*c* and the surface 52*c* as a tapered inclination are adopted, and in order to avoid the rattling, as shown in FIG. 9C, two supporting members 52 each having a tapered surface are used and two guide grooves 53 may be provided so as to correspond to the supporting members 52. In this way, the two supporting members 52 and the guide groove 53 can be engaged with each other for positioning.

Figure 10A:
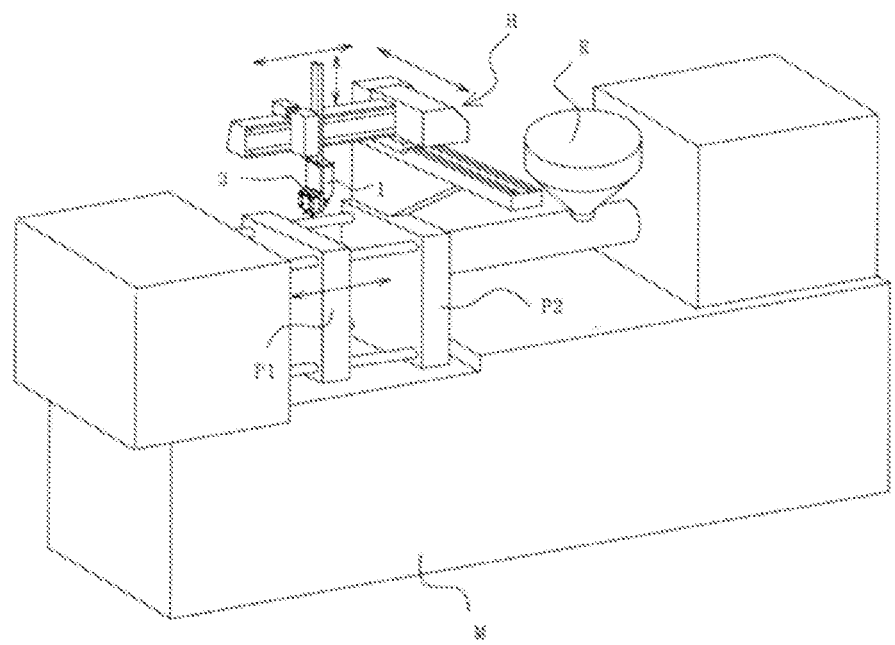
FIGS. 10A and 10B are diagrams explaining the relationship between a taking out device and an attaching/detaching structure of the present invention.
Figure 10B:
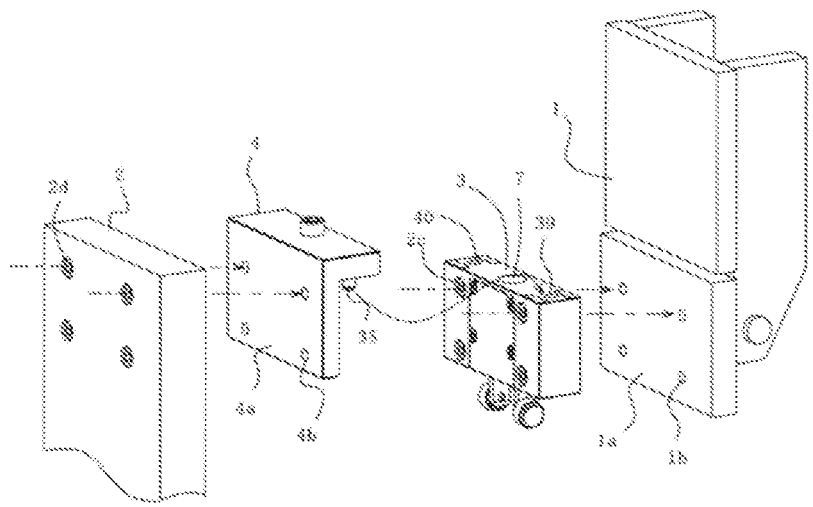

Next, a case where the attaching/detaching structure is used for a taking out arm H will be described with reference to FIGS. 10A and 10B. In these figures, the taking out arm H is provided in a resin molding device M. In these figures, the attaching/detaching structure of the first embodiment is shown. In the resin molding device M, one of a pair of molding dies (not shown) is attached to platens P1 and P2, and the pair of molding dies are closed by bringing the platens P1 and P2 close to each other, and resin R is poured into the molding die to create a resin product. Thereafter, the platens P1 and P2 are separated from each other to open the mold. The taking out arm H detaches the resin product from the mold-opened molded die and stores it in a pareto (not shown).

A movable portion 1 at the tip of the taking out arm H has an attaching surface 1*a* formed. The attaching surface 1*a* is provided with screw holes 1*b*, and a tool 2 can be attached through bolts 2*d*. The tool 2 includes, for example, a tool with a suction pad or a tool with a nipper for a gate cutter, and the like. The tool 2 is replaced by changing molding dies or the like. The attaching/detaching structure is intervened between the movable portion 1 and the tool 2. The first connecting member 3 is attached to the attaching surface 1*a* of the movable portion 1 using the screw holes 1*b* with the bolts 2*c*, and the tool 2 is attached to an attaching surface 4*a* provided to a screw hole 4*b* in the same way as the attaching surface 1*a* using the screw holes 1*b* of the second connecting member 4 with the bolts 2*d*. The separation/connection between the tool 2 and the movable portion 1 is performed through an attaching/detaching structure.

When the operator grips the two clamp arms 10 and 11 when pulling the second connecting member 4 from the insertion hole 7 of the first connecting member 3, the engagement between the first connecting member 3 and the second connecting member 4 is disengaged. At this time, the pressing forces acted on the clamp arms 10 and 11 are canceled to have almost no effect on other members such as the first connecting member 3 and the second connecting member 4. Therefore, it is possible to prevent the pressing force due to the gripping operation from pushing the movable portion 1 through the first connecting member 3 and shifting its stop position.

DESCRIPTION OF THE REFERENCE NUMERAL

3 first connecting member
4 second connecting member
5 base member
6 seating surface
7 insertion hole
8 operation chamber
10, 11 clamp arm
10*a*, 11*a* middle portion
10*b*, 11 *b* one end portion
10*c*, 11*c* the other end portion
12, 13, 51 rotary support shaft
14, 15 protrusion
16, 17 engaging portion
18, 19 operating portion
24 holding spring (urging means)
32, 32A, 32B engaging member
33, 33A, 33B recess
34, 34A, 34B lock portion
35, 35A, 36, 36A positioning pin
39, 39A, 40, 40A reference hole

The invention claimed is:

1. An attaching/detaching structure for attaching/detaching a second connecting member to/from a first connecting member, the attaching/detaching structure comprising:
  a seating surface formed on a base member of the first connecting member so that the second connecting member is contacted when the second connecting member is attached to the first connecting member;
  an operation chamber formed in the base member and transmitted to an outside of the base member via an insertion hole opened to the seating surface;
  two clamp arms provided in the operation chamber so as to be symmetrical around an axial center of the operation chamber, and each of the two clamp arms having an intermediate portion in a longitudinal direction rotatably supported by at least one rotary support shaft protruded from an inner wall of the operation chamber,
an engaging portion formed at one end portion in the longitudinal direction of each of the two clamp arms,
an operating portion provided at the other end portion in the longitudinal direction of each of the two clamp arms,
an urging means for separating the operating portion of each of the two clamp arms by rotating the two clamp arms;
at least one engaging member protruding from the second connecting member and insertable into the insertion hole;
at least one lock portion formed on the at least one engaging member so that the engaging portion of each of the two clamp arms is engaged when the second connecting member is attached to the first connecting member, and
positioning pins insertable into reference holes formed on one member of the first connecting member and the second connecting member, the positioning pins protruding from the other member of the first connecting member and the second connecting member so as to be parallel to the at least one engaging member.

2. An attaching/detaching structure for attaching/detaching a second connecting member to/from a first connecting member, said attaching/detaching structure comprising:
a seating surface formed on a base member of the first connecting member so that the second connecting member is contacted when the second connecting member is attached to the first connecting member;
an operation chamber formed in the base member and transmitted to an outside of the base member via an insertion hole opened to the seating surface;
two clamp arms provided in the operation chamber so as to be symmetrical around an axial center of the operation chamber, and each of the two clamp arms having an intermediate portion in a longitudinal direction rotatably supported by at least one rotary support shaft protruded from an inner wall of the operation chamber,
an engaging portion formed at one end portion in the longitudinal direction of each of the two clamp arms,
an operating portion provided at the other end portion in the longitudinal direction of each of the two clamp arms,
an urging means for separating the operating portion of each of the two clamp arms by rotating the two clamp arms;
at least one engaging member protruding from a ceiling surface of the second connecting member and insertable into the insertion hole;
at least one lock portion formed on the at least one engaging member so that the engaging portion of each of the two clamp arms is engaged when the second connecting member is attached to the first connecting member;
a supporting surface formed on the base member so as to intersect the seating surface;
a supported surface formed on the second connecting member so as to intersect the ceiling surface and capable of contacting the supporting surface, and
a guide groove opened to one of the supporting surface and the supported surface, and in which a supporting member protruding from the other surface of the supporting surface and the supported surface is inserted.

3. The attaching/detaching structure according to claim 1, wherein a protrusion protrudes on the one end portion of each of the two clamp arms toward the axial center of the operation chamber so as to face each other;
each engaging portion is composed by a part of a corresponding protrusion;
at least one recess is formed on an outer wall of the at least one engaging member, and
the at least one lock portion is structured by a part of the at least one recess.

4. The attaching/detaching structure according to claim 1, wherein one protrusion protruding from the one end portion of one clamp arm of the two clamp arms and another protrusion protruding from the one end portion of the other clamp arm of the two clamp arms are formed toward an inner wall of the operation chamber so as not to face each other,
the engaging portion of each of the two clamp arms is composed by a part of a corresponding protrusion;
two engaging members are provided in the first connecting member when the first connecting member is attached to the second connecting member;
a recess formed on one engaging member of the two engaging members faces a recess formed in the other engaging member of the two engaging members, and
each of the two engaging members includes a lock portion composed by a part of a corresponding recess.

5. The attaching/detaching structure according to claim 2, wherein the supporting member has a small diameter portion and a large diameter portion formed sequentially from a base end side to a tip side, and
the small diameter portion of the supporting member is inserted into the guide groove.

6. The attaching/detaching structure according to claim 2, wherein a protrusion protrudes on the one end portion of each of the two clamp arms toward the axial center of the operation chamber so as to face each other;
each engaging portion is composed by a part of a corresponding protrusion;
at least one recess is formed on an outer wall of the at least one engaging member, and
the at least one lock portion is structured by a part of the at least one recess.

7. The attaching/detaching structure according to claim 2, wherein one protrusion protruding from the one end portion of one clamp arm of the two clamp arms and another protrusion protruding from the one end portion of the other clamp arm of the two clamp arms are formed toward an inner wall of the operation chamber so as not to face each other,
the engaging portion of each of the two clamp arms is composed by a part of a corresponding protrusion;
two engaging members are provided in the first connecting member when the first connecting member is attached to the second connecting member;
a recess formed on one engaging member faces a recess formed in the other engaging member, and
each of the two engaging members includes a lock portion composed by a part of a corresponding recess.

* * * * *